United States Patent
Kim et al.

(10) Patent No.: US 9,883,177 B2
(45) Date of Patent: Jan. 30, 2018

(54) STEREOSCOPIC IMAGE DISPLAY DEVICE AND EYE-TRACKING METHOD THEREOF

(71) Applicant: LG DISPLAY CO., LTD., Seoul (KR)

(72) Inventors: Jeong-Ki Kim, Paju-si (KR); Seung-Ho Baek, Goyang-si (KR); Joo-Ah Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/246,933

(22) Filed: Apr. 7, 2014

(65) Prior Publication Data

US 2014/0300536 A1    Oct. 9, 2014

(30) Foreign Application Priority Data

Apr. 9, 2013 (KR) .................. 10-2013-0038815

(51) Int. Cl.
*G09G 5/00*    (2006.01)
*H04N 13/04*    (2006.01)

(52) U.S. Cl.
CPC ..... *H04N 13/0484* (2013.01); *H04N 13/0404* (2013.01); *H04N 13/0413* (2013.01)

(58) Field of Classification Search
CPC ...... G09G 1/06; H04N 13/04; H04N 13/0402; H04N 13/0409
See application file for complete search history.

(56) References Cited

U.S. PATENT DOCUMENTS

| | | | | |
|---|---|---|---|---|
| 5,287,437 A | * | 2/1994 | Deering ............ | G06T 15/10 345/419 |
| 6,831,678 B1 | * | 12/2004 | Travis ............ | 348/46 |
| 7,418,113 B2 | * | 8/2008 | Porikli et al. ............ | 382/103 |
| 8,587,642 B2 | * | 11/2013 | Shestak ............ | G02B 27/2264 348/55 |
| 8,988,506 B2 | * | 3/2015 | Bennett et al. ............ | 348/46 |
| 2002/0015007 A1 | * | 2/2002 | Perlin et al. ............ | 345/6 |
| 2006/0139711 A1 | * | 6/2006 | Leister et al. ............ | 359/9 |

(Continued)

FOREIGN PATENT DOCUMENTS

| | | |
|---|---|---|
| CN | 1845612 A | 10/2006 |
| CN | 102438165 A | 5/2012 |
| JP | 6-187424 A | 7/1994 |

*Primary Examiner* — Kent Chang
*Assistant Examiner* — William Lu
(74) *Attorney, Agent, or Firm* — Birch, Stewart, Kolasch & Birch, LLP

(57) ABSTRACT

Discussed are a stereoscopic image display device to implement high-speed eye-tracking techniques and an eye-tracking method. The stereoscopic image display in one embodiment includes an image panel to alternately display left-eye and right-eye images, a switchable panel disposed at the front or rear side of the image panel to separate the left-eye and the right-eye images from each other to correspond to the left and right eyes of a viewer, a camera mounted to the image panel to capture an image of the viewer, and a computer system to detect position information of the viewer from the image input and calculate midpoint information between the detected position information by interpolation using the detected position information to update position information of the viewer at a faster drive frequency than a drive frequency of the camera, and to control driving of the switchable panel in response to the updated position information.

5 Claims, 3 Drawing Sheets

(56) References Cited

U.S. PATENT DOCUMENTS

| | | | |
|---|---|---|---|
| 2006/0146046 A1* | 7/2006 | Longhurst et al. | 345/418 |
| 2006/0227103 A1* | 10/2006 | Koo | H04N 13/0468 345/156 |
| 2008/0024598 A1* | 1/2008 | Perlin et al. | 348/55 |
| 2008/0232680 A1* | 9/2008 | Berestov | H04N 13/0059 382/154 |
| 2010/0165079 A1* | 7/2010 | Yamada | H04N 13/004 348/43 |
| 2011/0248987 A1* | 10/2011 | Mitchell | G06T 15/20 345/419 |
| 2012/0038634 A1* | 2/2012 | Cha | H04N 13/0404 345/419 |
| 2013/0010085 A1* | 1/2013 | Takata | G09G 3/003 348/47 |
| 2013/0300827 A1* | 11/2013 | Ueno | H04N 13/0285 348/43 |
| 2014/0241614 A1* | 8/2014 | Lee | 382/154 |

* cited by examiner

STEREOSCOPIC IMAGE DISPLAY DEVICE AND EYE-TRACKING METHOD THEREOF

This application claims the benefit of the Korean Patent Application No. 10-2013-0038815, filed on Apr. 9, 2013 in Republic of Korea, which is hereby incorporated by reference as if fully set forth herein.

BACKGROUND OF THE INVENTION

Field of the Invention

The present invention relates to a stereoscopic image display device, and more particularly, to a stereoscopic image display device, which may implement high-speed eye-tracking techniques using a low-speed camera, and an eye-tracking method thereof.

Discussion of the Related Art

Stereoscopic image display devices, designed to display a realistic 3-dimensional (3D) image, have been applied to a variety of fields including medicine, education, games, movies, televisions, and the like. Such a stereoscopic image display device displays a left-eye image and a right-eye image separate from each other in terms of space or time to cause a viewer to perceive 3D effects from binocular parallax images.

Representative methods to display a 3D image include a glasses method using special glasses and a non-glasses method not using special glasses. In the glasses method, a display device displays a left-eye image and a right-eye image by changing polarization of the images or by separating the images from each other in a time division manner, and a viewer perceives 3D effects using polarized glasses or liquid-crystal shutter glasses. In the non-glasses method, a display device displays a 3D image using optical filters installed to a front or rear face thereof, such as a lenticular sheet, a parallax barrier, and the like.

More specifically, a non-glasses type stereoscopic image display device includes an image panel to display an image, and a switchable panel disposed at the front or rear side of the image panel to spatially separate a left-eye image and a right-eye image from each other by varying a barrier position or a lens position per the left-eye image and the right-eye image.

In addition, the stereoscopic image display device utilizes eye-tracking techniques, which detects the face of a viewer from an image input via a camera mounted to the image panel, and subsequently detects eye position information of the viewer relative to the stereoscopic image display device (e.g., X, Y, and Z coordinates), and display a 3D image while tracking a position of the viewer who is moving by varying a barrier position or a lens position of the switchable panel based on the detected eye position information of the viewer.

Conventionally, the stereoscopic image display device synchronizes update of position information of the viewer with a drive frequency (image capture speed) of the camera. However, the camera is driven at a lower speed than a drive frequency of the switchable panel, and thus position information of the viewer is updated at a lower speed than the drive frequency of the switchable panel, which makes it impossible to display a 3D image accurately conforming to a position of the viewer who is moving. Although this problem may be solved by using a camera having a high drive frequency, a low-speed camera is generally used because of restrictions in terms of price and size of the camera.

SUMMARY OF THE INVENTION

Accordingly, the present invention is directed to a stereoscopic image display device and an eye-tracking method thereof that substantially obviate one or more problems due to limitations and disadvantages of the related art.

An object of the present invention is to provide a stereoscopic image display device, which may implement high-speed eye-tracking techniques using a low-speed camera, and an eye-tracking method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device includes an image panel configured to alternately display a left-eye image and a right-eye image, a switchable panel disposed at the front or rear side of the image panel to separate the left-eye image and the right-eye image from each other so as to correspond to the left eye and the right eye of a viewer, a camera mounted to the image panel to capture an image of the viewer, and a computer system configured to detect position information of the viewer from the image input by the camera and calculate midpoint information of the viewer between the detected position information by interpolation using the detected position information to update position information of the viewer at a faster drive frequency than a drive frequency of the camera, and also configured to control driving of the switchable panel in response to the updated position information of the viewer.

The computer system may detect the face of the viewer from the image input by the camera, and then may detect two pieces of eye position information of the viewer from the detected face, and may calculate n pieces of midpoint information (here, n is a natural number) between the two pieces of eye position information via interpolation using the detected two pieces of eye position information. Each piece of the eye position information of the viewer may include X, Y, and Z coordinates, and the computer system may calculate the n pieces of midpoint information by summing the two pieces of eye position information per coordinate and dividing the sum per coordinate by 1/n.

The computer system may update the eye position information of the viewer at 2× or 4× the drive frequency of the camera.

In accordance with another aspect of the invention, an eye-tracking method of a stereoscopic image display device, includes inputting an image of a viewer, captured by a camera mounted to an image panel, detecting the face of the viewer from the input image and detecting eye position information of the viewer from the detected face, calculating midpoint information of the viewer between the detected eye position information of the viewer by interpolation using the detected eye position information, to update the eye position information of the viewer at a faster drive frequency than a drive frequency of the camera, and controlling driving of a switchable panel disposed at the front or rear side of the image panel in response to the updated position information of the viewer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
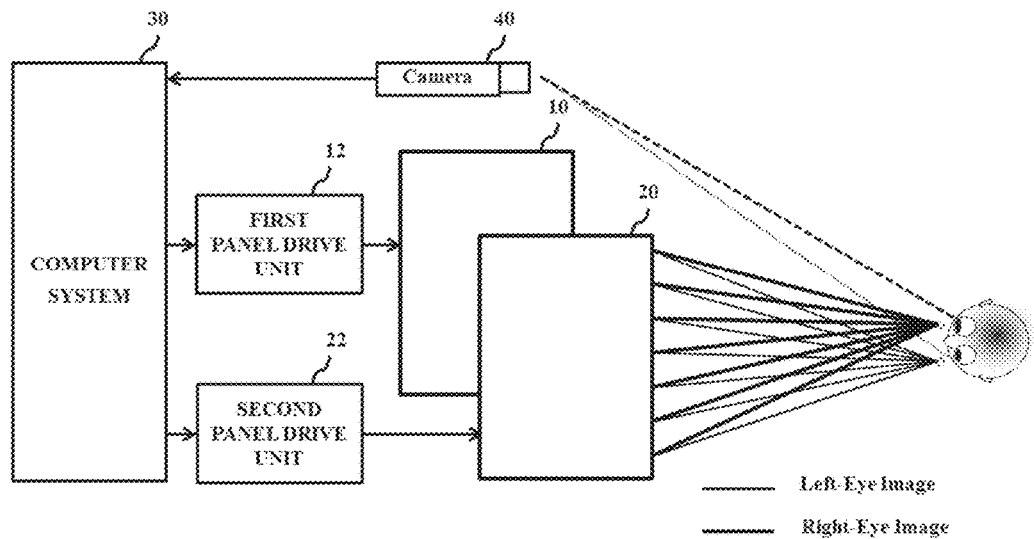
FIG. 1 is a block diagram schematically showing a configuration of a stereoscopic image display device according to an embodiment of the present invention.

FIG. 1 is a block diagram schematically showing a configuration of a stereoscopic image display device according to an embodiment of the present invention.

The stereoscopic image display device, as exemplarily shown in FIG. 1, includes a dual-panel type image panel 10 to display a left-eye image and a right-eye image, and a switchable panel 20 disposed at the front or rear side of the image panel 10 to separate the left-eye image and the right-eye image from each other by varying a position of a barrier that shields light or a position of a lens that refracts light based on the left-eye image and the right-eye image of the image panel 10 and position information of a viewer. For convenience of description, although FIG. 1 shows only a configuration in which the switchable panel 20 is disposed at the front side of the image panel 10, when the image panel 10 is a liquid crystal panel using a backlight unit as a light source, the switchable panel 20 may be disposed at the rear side of the image panel 10, i.e. between the backlight unit and the image panel 10. Hereinafter, only the configuration in which the switchable panel 20 is disposed at the front side of the image panel 10 will be described by way of example.

The image panel 10 alternately displays a left-eye image and a right-eye image in a time division manner for display of a 3D image. For example, the image panel 10 displays a left-eye image at an odd frame and displays a right-eye image at an even frame to alternately display the left-eye image and the right-eye image per frame. Alternatively, the image panel 10 may display a 2D image.

The image panel 10 may be a liquid crystal panel, an organic light emitting diode display panel, a plasma display panel, or the like. In one example in which the image panel 10 is a liquid crystal panel, the image panel 10 includes a color filter substrate having a color filter array, a thin film transistor substrate having a thin film transistor array, a liquid crystal layer encapsulated between the color filter substrate and the thin film transistor substrate, and polarizer plates attached respectively to outer surfaces of the color filter substrate and the thin film transistor substrate. The image panel 10 displays an image via a matrix of multiple pixels. Each pixel emits a desired color of light using a combination of red/green/blue (R/G/B) sub-pixels which adjust light transmittance as arrangement of liquid crystals varies based on a data signal, and further includes a white (W) sub-pixel to enhance brightness as needed. Each sub-pixel includes a thin film transistor (TFT) connected to a gate line (GL) and a data line (DL), and a liquid crystal capacitor (Clc) and a storage capacitor (Cst) connected to the thin film transistor in parallel. The liquid crystal capacitor is charged with a differential voltage between a data signal applied to a pixel electrode through the thin film transistor and a common voltage (Vcom) applied to a common electrode, and adjusts light transmittance by driving liquid crystals based on the charged voltage. The storage capacitor stores the charged voltage of the liquid crystal capacitor. The liquid crystal layer is driven by a vertical field as in a Twisted Nematic (TN) mode or a Vertical Alignment (VA) mode, or is driven by a horizontal field as in an In-Plane Switching (IPS) mode or in a Fringe Field Switching (FFS) mode.

The switchable panel 20 is attached to a front face of the image panel 10 and includes a liquid crystal panel, which serves as an optical filter, such as a switchable barrier to vary a position of a barrier or a switchable lens to vary a position of a lens based on the left-eye image and the right-eye image of the image panel 10 and position information of the viewer when the image panel 10 displays a 3D image. Alternatively, when the image panel 10 is the liquid crystal panel, the switchable panel 20 may be disposed between the backlight unit and the image panel 10.

When the image panel 10 displays a 3D image, the switchable panel 20 enters a barrier mode or a lens mode such that the left-eye image and the right-eye image displayed on the image panel 10 are separately perceived by the left eye and the right eye of the viewer to allow the viewer to view a 3D image. Alternatively, when the image panel 10 displays a 2D image, the switchable panel 20 exits the barrier mode or the lens mode such that all cells are driven in the same light transmitting mode (2D mode) to allow the viewer to view the 2D image displayed on the image panel 10.

Hereinafter, only the case in which the image panel 10 and the switchable panel 20 display a 3D image will be described.

More specifically, when the image panel 10 displays a left-eye image, the switchable panel 20 varies a barrier position or a lens position to display the left-eye image at a position of the left eye of the viewer. In addition, when the image panel 10 displays a right-eye image, the switchable panel 20 varies a barrier position or a lens position based on position information of the viewer to display the right-eye image at a position of the right eye of the viewer. In this way, the left-eye image and the right-eye image, sequentially displayed on the image panel 10, are separately perceived by the left-eye and the right-eye of the viewer, which allows the viewer to view a 3D image.

The switchable panel 20 described above is a mono panel in which a corresponding cell is turned on or off based on a drive voltage to selectively shield light, or in which an index of refraction of liquid crystals is variable based on a drive voltage to form a lens.

The stereoscopic image display device, as exemplarily shown in FIG. 1, further includes a first panel drive unit 12 to drive the image panel 10, a second panel drive unit 22 to drive the switchable panel 20, a computer system 30 connected to the first and second panel drive units 12, 22, and a camera 40 to transmit a captured image of the viewer to the computer system 30.

The first panel drive unit 12 drives the image panel 10 such that left-eye image data and right-eye image data fed from the computer system 30 are displayed on the image panel 10. To this end, the first panel drive unit 12 may include a first data driver (not shown) to drive data lines of the image panel 10, a first gate driver (not shown) to drive gate lines, and a first timing controller (not shown) to control drive timing of the first data driver and the first gate driver.

The second panel drive unit 22 drives the switchable panel 20 using control data fed from the computer system 30 based on left-eye and right-eye images and position information of the viewer. The second panel drive unit 22 may include a second data driver (not shown) and a second gate driver (not shown) to drive data lines and gate lines of the switchable panel 20 respectively, and a second timing controller (not shown) to control drive timing of the second data driver and the second gate driver.

The camera 40 traces a position of the viewer and transmits a captured image of the viewer to the computer system 30.

The computer system 30 feeds the left-eye image data and the right-eye image data, which will be displayed on the image panel 10, and multiple synchronization signals to the first panel drive unit 12. In addition, the computer system 30 detects position information of the viewer from the image input via the camera 40, produces control data to control driving of the switchable panel 20 based on the detected position information, and feeds the same to the second panel drive unit 22. In this case, the computer system 30 may update position information of the viewer at a faster drive frequency than a drive frequency of the low-speed camera 40 by detecting more than one midpoint between proximate first and second positions of the viewer via interpolation using first and second position information of the viewer detected from the image of the camera 40.

Figure 2:
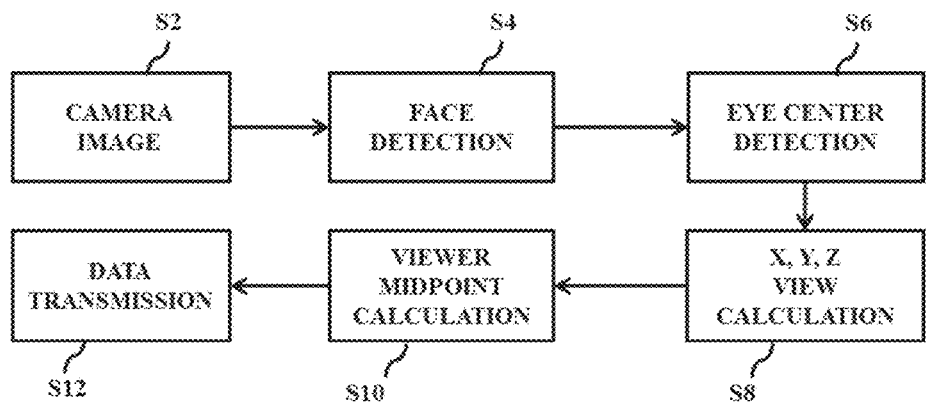
FIG. 2 is a flowchart showing the sequence of an eye-tracking method of a computer system shown in FIG. 1.

More specifically, an eye-tracking algorithm of the computer system 30 as exemplarily shown in FIG. 2 is as follows.

In a step S2, the computer system 30 inputs an image captured by the camera 40, and in Operation S4, the computer system 30 detects the face of the viewer from the input image. For example, the computer system 30 detects the face of the viewer from the input image via face detection using, e.g., a Haar classifier.

In a step S6, the computer system 30 detects coordinates of the center between the left eye and the right eye (hereinafter referred to as eye center) from the detected face of the viewer. For example, the computer system 30 initially selects specific points, such as the left eye and the right eye, using an eye model, such as, e.g., an Active Appearance Model (AAM), and then detects coordinates of the eye center as a final specific point using, e.g., an Elastic Bunch Graph Matching (EBGM) model.

Figure 3:
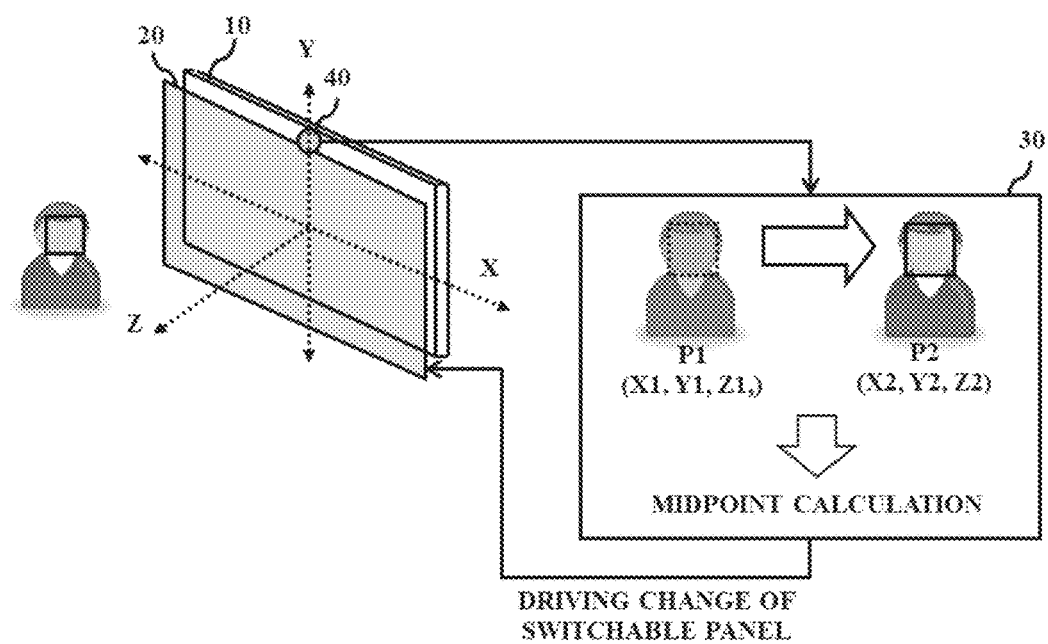
FIG. 3 is a diagrammatic view showing an eye-tracking method of a stereoscopic image display device according to an embodiment of the present invention.

In a step S8, the computer system 30 calculates eye position information of the viewer by applying the detected coordinates of the eye center to an eye-based distance model. The eye position information of the viewer, as exemplarily shown in FIG. 3, includes X, Y, and Z coordinates calculated on the basis of the center of the stereoscopic image display device. In this case, the computer system 30 detects eye position information of the viewer from an input image whenever the input image is input from the camera 40, the eye position information of the viewer is detected at the same drive frequency as a drive frequency of the camera 40.

In a step S10, the computer system 30 calculates more than one midpoint between proximate first and second eye positions by interpolation using detected first and second eye position information P1, P2 to update the position information of the viewer at a faster drive speed than the drive frequency of the camera 40. For example, the computer system 30 may detect eye position information of the viewer at a drive frequency of 30 Hz from the image input by the camera 40, and calculate midpoint information between the detected eye position information by interpolation using the detected eye position information to update the position information of the viewer at a frequency of 60 Hz or 120 Hz.

When attempting to calculate n pieces of midpoint information between the first and second eye position information P1, P2 (n being a natural number), the n pieces of midpoint information may be calculated by dividing the sum of respective coordinates as the first and second eye position information P1, P2 by 1/n.

Figure 4:
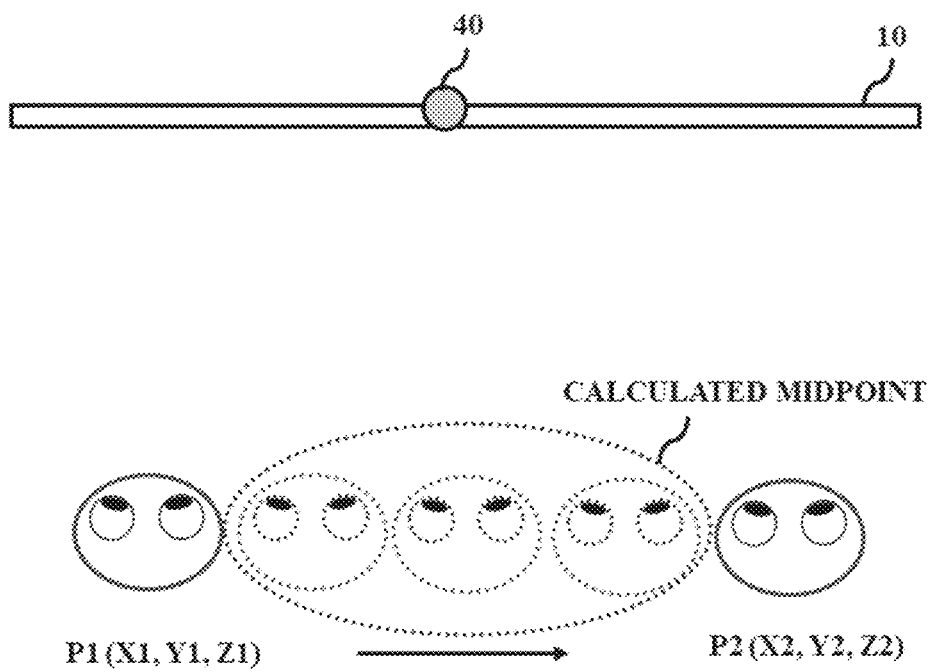
FIG. 4 is a view showing position information of a viewer updated by the eye-tracking method of the stereoscopic image display device according to the embodiment of the present invention.

For example, as exemplarily shown in FIG. 4, the computer system 30 may detect first eye position information X1, Y1, Z1 and second eye position information X2, Y2, Z2 of the viewer from the image input by the camera 40. Then, when it is intended to calculate three pieces of midpoint information between the detected first eye position information X1, Y1, Z1 and the detected second eye position information X2, Y2, Z2, the computer system 30 may calculate the sum of the detected first eye position information X1, Y1, Z1 and the detected second eye position information X2, Y2, Z2 per each coordinate, and divide the sum of the respective coordinates by ⅓. In this way, the computer system 30 may update eye position information of the viewer at 4× the drive frequency of the image input from the camera 40.

In a step S12, the computer system 30 produces control data to drive the switchable panel 20 based on the updated position information of the viewer, and feeds the same to the second panel drive unit 22.

As is apparent from the above description, in a stereoscopic image display device and an eye-tracking method thereof according to the present invention, first position information and second position information of a viewer are detected from an image captured by a low-speed camera, and midpoint information between the first and second position information of the viewer is calculated via interpolation using the detected first and second position information, which enables update of position information of the viewer at a speed similar to a drive frequency of a high-speed driven switchable panel. This faster update of position information of the viewer than a drive speed of the low-speed camera may attain more accurate tracking of a position of the viewer who is moving than in the related art, resulting in formation of a more natural 3D image than that of the related art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A stereoscopic image display device comprising:
an image panel configured to alternately display a left-eye image and a right-eye image;

a switchable panel disposed at a front or rear side of the image panel to separate the left-eye image and the right-eye image from each other so as to correspond to the left eye and the right eye of a viewer;

a camera mounted to the image panel to capture an image of the viewer; and a computer system configured to:

provide left-eye and right-eye image data to a first panel drive unit to display the left-eye and right-eye images on the image panel, detect a face of the viewer from the captured image of the viewer, detect eye position information including first eye position information at a first position and second eye position information at a second position of the viewer from the detected face, each of the first and second eye position information including x, y, and z coordinates, calculate more than one midpoint information of the viewer between the detected first eye position information and second eye position information by interpolation using the detected first and second eye position information, wherein the computer system detects the first and second eye position information of the viewer when the captured image of the viewer is input from the camera at a first drive frequency, and calculates the more than one midpoint information between the detected first and second eye position information to update the eye position information of the viewer at a second drive frequency higher than the first drive frequency, produce control data to control driving of the switchable panel based on the updated eye position information of the viewer, and provide the control data to a second panel drive unit to drive the switchable panel at a drive frequency higher than the first drive frequency of the camera, wherein the computer system detects first center coordinates between the left eye and right eye at the first position of the viewer to detect the first eye position information and second center coordinates between the left eye and the right eye at the second position of the viewer to detect the second eye position information using the images input by the camera, and calculates center coordinates of the more than one midpoint position between the first and second positions of the viewer to update the eye position information.

2. The device according to claim 1, wherein the computer system detects faces of the viewer from the images input by the camera, and then detects the first center coordinates and the second center coordinates from the detected faces.

3. The device according to claim 2, wherein the computer system updates the first and second eye position information as the center coordinates of the viewer at 2× or 4× the drive frequency of the camera.

4. A method of operating a stereoscopic image display device, the method comprising:

providing left-eye and right-eye image data to a first panel drive unit to alternately display left-eye and right-eye images via an image panel;

separating the left-eye and right-eye images from each other via a switchable panel disposed at a front or rear side of the image panel so as to correspond to the left and right eyes of a viewer;

receiving images of the viewer, captured by a camera mounted to the image panel;

detecting, via the camera, a face of the viewer from the captured images of the viewer and detecting, via a computer system, eye position information including first eye position information at a first position and second eye position information at a second position of the viewer from the detected face, each of the first and second eye position information including x, y, and z coordinates;

calculating, via the computer system, more than one midpoint information of the viewer between the detected first eye position information and second eye position information by interpolation using the detected eye position information, wherein the computer system detects the first and second eye position information of the viewer when the captured image of the viewer is input from the camera at a first drive frequency, and calculates the more than one midpoint information between the detected first and second eye position information to update the eye position information of the viewer at a second drive frequency higher than the first drive frequency;

producing control data to control driving of the switchable panel based on the updated eye position information of the viewer; and providing the control data to a second panel drive unit to drive the switchable panel at a drive frequency higher than the first drive frequency of the camera, wherein the detecting the eye position information of the viewer comprises:

detecting first center coordinates between the left-eye and right-eye at the first position of the viewer to detect the first eye position information and second center coordinates between the left eye and the right eye at the second position of the viewer to detect the second eye position information using the images input by the camera; and calculating center coordinates of the more than one midpoint position between the first and second positions of the viewer to update the eye position.

5. The method according to claim 4, wherein the first and second eye position information as the center coordinates of the viewer is updated at 2× or 4× the drive frequency of the camera.

* * * * *